US012643514B2

(12) United States Patent
Venegas Diaz et al.

(10) Patent No.: US 12,643,514 B2
(45) Date of Patent: Jun. 2, 2026

(54) METHOD FOR ADJUSTING A BRAKE PEDAL CHARACTERISTIC

(71) Applicant: KNORR-BREMSE Systeme fuer Nutzfahrzeuge GmbH, Munich (DE)

(72) Inventors: Fernando Venegas Diaz, Munich (DE); Gabor Liptak, Budapest (HU); Aron Kutas, Izsak (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 204 days.

(21) Appl. No.: 18/690,311

(22) PCT Filed: Aug. 29, 2022

(86) PCT No.: PCT/EP2022/073921
§ 371 (c)(1),
(2) Date: Mar. 8, 2024

(87) PCT Pub. No.: WO2023/036643
PCT Pub. Date: Mar. 16, 2023

(65) Prior Publication Data
US 2024/0367627 A1 Nov. 7, 2024

(30) Foreign Application Priority Data
Sep. 9, 2021 (EP) .................................... 21195861

(51) Int. Cl.
*B60T 8/32* (2006.01)
*B60T 7/04* (2006.01)
*B60T 13/58* (2006.01)
(52) U.S. Cl.
CPC ............ *B60T 8/3255* (2013.01); *B60T 7/042* (2013.01); *B60T 13/58* (2013.01); *B60T 13/585* (2013.01); *B60T 8/3215* (2013.01)

(58) Field of Classification Search
CPC .... B60T 8/3255; B60T 7/042; B60T 2270/60; B60T 8/3215; B60T 13/585; B60T 13/586; B60T 13/58; B60T 17/083
See application file for complete search history.

(56) References Cited

U.S. PATENT DOCUMENTS

2012/0136547 A1* 5/2012 Miyazaki ................ B60L 3/108
701/70
2020/0254983 A1 8/2020 Suzuki et al.
2022/0080942 A1* 3/2022 Eberl .............. B60W 30/18063

FOREIGN PATENT DOCUMENTS

DE 10 2019 103 375 A1 8/2020
EP 1 820 709 A2 8/2007
JP 2020-50060 A 4/2020

OTHER PUBLICATIONS

International Search Report (PCT/ISA/210) issued in PCT Application No. PCT/EP2022/073921 dated Dec. 19, 2022 (5 pages).
(Continued)

*Primary Examiner* — Jacob M Amick
(74) *Attorney, Agent, or Firm* — Crowell & Moring LLP

(57) ABSTRACT
A method adjusts a brake pedal characteristic of a vehicle having a brake pedal configured to generate a brake pedal deceleration demand and at least one further deceleration demand generating device to generate at least one further deceleration demand. The vehicle is configured to decelerate according to the brake pedal deceleration demand and to the at least one further deceleration demand. The method determines an achievable deceleration potential as a result of the further deceleration demand; generates a deceleration demand for adjusting the brake pedal deceleration demand at 0% brake pedal input according to the achievable deceleration potential; and adjusts the brake pedal characteristic of the vehicle.

17 Claims, 4 Drawing Sheets

(56)          References Cited

OTHER PUBLICATIONS

Written Opinion (PCT/ISA/237) issued in PCT Application No. PCT/EP2022/073921 dated Dec. 19, 2022 (7 pages).
Extended European Search Report issued in European Application No. 21195861.6 dated Mar. 11, 2022 (7 pages).

* cited by examiner

METHOD FOR ADJUSTING A BRAKE PEDAL CHARACTERISTIC

BACKGROUND AND SUMMARY

The present invention relates to a method for adjusting a brake pedal characteristic of a vehicle. Further, the invention relates to a device, a vehicle, a computer program product and a storage medium.

Preferably, in the context of this application, a driver's input or an input of or by a driver describes an action of a driver, wherein the driver enters an input value to the vehicle or to a system of the vehicle to affect the vehicle or the system accordingly. The input value can be generated by a pedal, in particular a brake or accelerator pedal. Preferably, the driver's input is a pedal position. In the following, it is assumed that the driver's input is generated by a pedal. Furthermore, the expression 'pedal' can be understood as a classic pedal that is configured to be pressed by the foot of the driver. But devices other than a classic pedal can be used as well, for example a manually operated device such as a lever. The driver's input can be a position, a pressure or any other physical value that is measured to learn the status of the respective pedal.

Preferably, in the context of this application, a brake unit comprises at least one brake that is activated according to a brake pedal deceleration demand generated actively by a driver's input, in particular by a brake pedal. In particular, the brake unit can comprise or act as a service brake of the vehicle. In contrast, a deceleration device is configured to decelerate a vehicle according to a deceleration demand, wherein the deceleration demand can be generated by the brake pedal but can also be generated by at least one further deceleration demand generating device, for example by an accelerator pedal. In particular, a deceleration device can comprise a retarder, a brake, in particular a brake that relates to a brake of the brake unit, an eddy current brake and/or an electric drivetrain with an electric machine. Vehicles mentioned in this application preferably comprise both, a brake unit and a deceleration device.

Retarders are used to assist the service brakes, which are usually part of the brake unit and improve the overall braking performance of a vehicle. Typically, in traditional internal combustion engine powertrains, the retarders dissipate the vehicle kinetic energy for example by transforming it into heat.

Furthermore, in the case of electric drivetrain vehicles, recuperative retarders can recapture and store energy in an electric storage for later use while decelerating the vehicle. This is accomplished by operating the electric drivetrain, respectively the electric machine, as a generator. The energy generated can be stored in an electric energy storage unit of the vehicle (regenerative braking).

Furthermore, a brake, in particular a mechanical brake as described later and/or an eddy current brake can be part of the deceleration device and/or of the brake unit as well.

These deceleration devices and the brake unit can be operated in different ways, according to different operating modes, wherein different levels of deceleration, respectively different levels of a braking force, can be achieved. One particular method to generate a deceleration demand signal, for recuperative or dissipative retardation, is the one-pedal-drive mode (OPD mode). This is a driver comfort feature that allows the driver to control both acceleration and braking with the use of one single pedal. In this mode, for example, when the accelerator pedal is released by the driver, or at least actuated less, the output signal generated by the accelerator pedal is interpreted as a deceleration demand, depending on the system configuration the vehicle will generate a respective braking force by the deceleration device.

The amount of deceleration or braking that can be accomplished in response to a command from the OPD mode is not always constant. For deceleration devices comprising recuperative retarders in electric powertrains for example, the actual deceleration accomplished depends on factors such as the state of charge (SOC) of the energy storage unit or temperatures of the powertrain components such as battery, electric motor or power electronics.

In the case of deceleration devices comprising dissipative retarders, the amount of deceleration or braking that can be accomplished is limited by factors such as vehicle velocity or response time of the retarder mechanism.

Preferably, in the context of the application, a deceleration demand describes a target value, for the brake unit and/or for the deceleration device and/or in general, for the vehicle. That means, in reaction to a deceleration demand supplied to the brake unit and/or to the deceleration device, the brake unit and/or the deceleration device apply a deceleration effect on the vehicle to achieve a deceleration of the vehicle corresponding to the target deceleration. In particular, the target deceleration can be generated from different sources. For example, the brake pedal generates a brake pedal deceleration demand and at least one further deceleration demand generating device generates a further deceleration demand. The vehicle can therefore be configured to select one of these deceleration demands or to add them up, in particular to a main deceleration demand.

When using a driving mode, wherein the vehicle is decelerated according to at least one further deceleration demand, in particular during OPD, the transition between the deceleration caused by the accelerator pedal as the at least one further deceleration demand generating device and the deceleration caused by the brake pedal has to be coordinated in order to avoid disruptions in the generation of the deceleration demand when the driver switches to the brake pedal.

However, in many cases, due to the fact that most vehicles have separate controllers for traction control and brake system control, the deceleration demanded by the accelerator pedal in OPD mode and the deceleration demanded by the brake pedal are "uncoordinated". In some other cases the brake pedal characteristic curve gets adjusted initially using the maximum possible retardation that OPD can demand, this is considered a "partial coordination". However, it is not guaranteed that at the moment of the transition from OPD to brake pedal actuation the maximum deceleration has been accomplished because of the limitations previously described.

FIGS. 1 and 2 show two approaches wherein the transition between the deceleration demand generated by the accelerator pedal and by the brake pedal is not coordinated or only coordinated for a particular case.

FIG. 1 shows an uncoordinated approach.

On the axis extending to the right, an input value from an accelerator pedal is shown from 0% to 100%, wherein the maximum input value of 100% is on the right. On the axis extending to the left, an input value from a brake pedal is shown from 0% to 100%, wherein the maximum input value of 100% is on the left.

On the axis extending upwards, an acceleration demand is shown from 0% to 100%, wherein the maximum acceleration demand is at the top of the axis at 100%. On the axis extending downwards, a deceleration demand is shown from 0% to 100%, wherein the maximum deceleration demand is at the lowest point of the axis at 100%.

In general, a pedal characteristic describes the correlation between an input value of the pedal (a pedal input or a pedal position) respectively a driver's input, in particular describing how much the pedal is pressed by a driver, and an output value of the pedal, in particular a deceleration demand value that is supplied as an input value to further systems or devices of the vehicle such as the deceleration device and the brake unit.

In FIG. 1, a brake pedal characteristic 1 and an accelerator pedal characteristic 2 are shown. The brake pedal characteristic 1 extends from zero brake pedal deceleration demand at an input value of 0% to 100% brake pedal deceleration demand at 100% of the brake pedal input value, which corresponds to the overall maximum deceleration demand. This point, the point of maximum deceleration demand is marked-up with an A.

The accelerator pedal characteristic 2 extends between the input value of 0% and 100% of the accelerator pedal. The shown accelerator pedal characteristic 2 shows a typical OPD characteristic, wherein by input via the accelerator pedal, a driver can accelerate and decelerate the vehicle by operating only the accelerator pedal. Between an input value of 0% and a point B, a deceleration demand is generated by the accelerator pedal. That means that if a driver operates the acceleration pedal in this section, the output of the accelerator pedal is a deceleration demand, in particular a further deceleration demand. Further, between the points B and C, the output of the accelerator pedal is zero. That means, that in this section neither a deceleration nor an acceleration demand is generated by the accelerator pedal. In general, this is a section causing the vehicle to coast. In the section defined by the points C and D, wherein D is the point of maximum acceleration demand, the input value of the accelerator pedal causes an acceleration demand.

Further, two achievable deceleration potentials 4 are shown as dotted horizontal lines, the vehicle can achieve as a reaction to the deceleration demand generated by the accelerator pedal. That means, since the achievable deceleration potentials 4 in the portion between 0% input value and B are located in the drawing above the section of the accelerator pedal characteristic 2, the full deceleration of the vehicle corresponding to the deceleration demand generated by the accelerator pedal cannot be achieved for example due to malfunction of the deceleration device or the brake unit. That means, the achievable deceleration potential relates to a deceleration, which can currently be achieved by the vehicle according to the deceleration demand of the accelerator pedal characteristic 2.

As it can be seen in FIG. 1, if the driver switches from the accelerator pedal to the brake pedal, the brake demand generated by the brake pedal at 0% brake pedal input does not correspond to the deceleration demand generated by the brake pedal at 0% accelerator pedal input and if the driver does not hit the corresponding brake pedal input value, a discontinuity in the demands generated by the accelerator pedal and by the brake pedal occurs.

FIG. 2 shows a partial coordinated approach according to the prior art, wherein the brake pedal characteristic 1 was adjusted so that the brake demand generated by the brake pedal at 0% input value corresponds to the maximum deceleration demand that is requested by the deceleration device at an accelerator pedal input of 0%.

Both approaches comprise the disadvantage that a discontinuity occurs or can occur when the driver switches from the accelerator pedal to the brake pedal, in particular when the achievable deceleration potential 4 does not correspond to the deceleration demand of the accelerator pedal. This occurs at every operation of the brake pedal according to the approach of FIG. 1 and it occurs at an operation of the brake pedal according to the approach of FIG. 2 when the maximum deceleration potential achievable by the deceleration device cannot be achieved, for example due to an electric storage that is at full state of charge (SOC) and cannot store electric energy any more.

Therefore, it is an object of the present invention to improve the generation of a deceleration demand for a vehicle, when the driver switches to the brake pedal.

This object is achieved by the subject-matter of the independent claims. Advantageous embodiments are the subject-matter of the dependent claims.

According to the invention, a method for adjusting a brake pedal characteristic of a vehicle, wherein the vehicle comprises a brake pedal configured to generate a brake pedal deceleration demand and at least one further deceleration demand generating device to generate a further deceleration demand, wherein the vehicle is configured to decelerate according to the brake pedal deceleration demand and to the at least one further deceleration demand, wherein the method comprises the steps:

step S1: determining an achievable deceleration potential as a result of the further deceleration demand;

step S2: generating a deceleration demand for adjusting the brake pedal characteristic at 0% brake pedal input according to the achievable deceleration potential; and step S3: adjusting the brake pedal characteristic of the vehicle.

The achievable deceleration potential preferably comprises an achievable deceleration of the vehicle. In particular, the achievable deceleration potential describes a maximum deceleration, which can be achieved by the vehicle according to the further brake demand.

Preferably, the determining of the achievable deceleration potential according to step S1 includes the determination of the achievable deceleration potential from measuring of a current deceleration of the vehicle as a reaction of the vehicle to a further deceleration demand, in particular a maximum further deceleration demand. Preferably, the current deceleration of the vehicle is measured by using an accelerator sensor or a rotational sensor, which is preferably configured to measure the speed of a wheel of the vehicle.

Additionally or alternatively, if the vehicle is configured to monitor its deceleration device(s), in particular the state of its deceleration device(s), the achievable deceleration potential according to step S1 can be determined from the monitoring directly or, wherein it is determined based on this monitoring. For example, if the deceleration device comprises a retarder, which is configured to decelerate the vehicle by converting the vehicle's kinetic energy via its drivetrain to thermal energy, such a retarder has a maximum operating temperature. If this temperature is reached or exceeded, a control unit of the vehicle controlling the deceleration device or at least the retarder, has to reduce the power of the retarder or cannot operate the retarder by a certain power. Therefore, the achievable deceleration caused by the further brake demand is reduced. This achievable deceleration can be determined by monitoring the temperature of the retarder. Alternatively or additionally, if the deceleration device comprises an electric machine configured to decelerate the vehicle by an operation of the electric machine in a generator mode, wherein the electric power generated by the electric machine is supplied to an electric energy storage or an to electric brake resistor, the deceleration, which can be achieved by the electric machine is limited by the capacity of the energy storage or by the temperature of the brake resistor. Therefore, by monitoring the state of charge of the energy storage or the temperature of the brake resistor, the achievable deceleration can be determined. Additionally or alternatively, if the deceleration device comprises a friction brake, in particular a friction brake, for example actuated electrically or pneumatically, the achievable deceleration potential can be determined by monitoring the wear of the friction elements of the brake, in particular of the brake pads.

In particular, the invention is directed to a method, wherein an achievable deceleration of a vehicle in reaction to a further deceleration demand is determined. According to this achievable deceleration, a brake pedal characteristic of the vehicle is adjusted, wherein according to the achievable deceleration potential, a brake pedal deceleration demand at 0% brake pedal input is generated and the brake pedal characteristic is adjusted, accordingly.

Preferably, if the achievable deceleration of the vehicle corresponds to the maximum of the further deceleration demand, the adjustment according to step S3 leads to a brake pedal characteristic, wherein the brake pedal deceleration demand at 0% brake pedal input corresponds to this deceleration demand. If the achievable deceleration does not correspond to the further maximum deceleration demand, the adjustment according to step S3 leads to a brake pedal characteristic, wherein the brake pedal deceleration demand at 0% brake pedal input is adjusted to this deceleration demand. For example, if the achievable deceleration corresponds to only 50% of the further maximum deceleration demand, the brake pedal deceleration demand at 0% brake pedal input is in particular generated accordingly in step S2 and adjusted in step S3 to this deceleration demand. That means, that the brake pedal generates a brake demand at 0% brake pedal input that corresponds to the achievable deceleration. Preferably, by keeping the point of maximum brake pedal deceleration demand of the brake pedal characteristic at 100% brake pedal input, a lower rise or increase of the brake pedal characteristic over the brake pedal input is achieved.

Preferably, the vehicle comprises a deceleration device and/or a brake unit, wherein the deceleration device and/or the brake unit are configured to decelerate the vehicle according to the brake pedal deceleration demand and/or according to the further deceleration demand. Preferably, the deceleration device comprises a retarder, a brake, in particular an endurance brake and/or an electric machine configured to decelerate the vehicle and/or wherein the brake unit comprises at least one mechanical brake as a friction brake, in particular a disc brake and/or drum brake.

Preferably, in step S3 the maximum brake pedal deceleration demand of the brake pedal characteristic is set at 100% brake pedal input. That means, when the brake pedal input is increased from 0% to 100%, the brake pedal input causing the brake pedal to generate its maximum brake pedal deceleration demand for the first time is at a fully pressed brake pedal (100% brake pedal input). Advantageously, this leads to a brake pedal characteristic, allowing the driver to control the deceleration via the brake pedal well, since the brake pedal characteristic is adjusted over the whole possible pedal input range.

Alternatively, in step S3 the maximum brake pedal deceleration demand of the brake pedal characteristic is set at a brake pedal input, which is lower than 100% brake pedal input. In this case the input range of the brake pedal until the maximum brake pedal deceleration demand is reached is shortened. That means, when the brake pedal input is increased from 0% to 100%, the brake pedal input causing the brake pedal to generate its maximum brake pedal deceleration demand for the first time is at a brake pedal input lower than 100%. Advantageously, this leads to a brake pedal characteristic, allowing the driver to quickly generate the maximum brake pedal deceleration demand. In particular, this approach is used during an emergency braking situation.

Preferably, in step S3 a brake pedal deceleration demand of the brake pedal characteristic is set at a brake pedal input between 0% brake pedal input and the brake pedal input causing the maximum brake pedal deceleration demand. The brake pedal deceleration demand, which is set here can be set according to a look-up-table or according to a mathematical formula. In particular, a linear, progressive or degressive brake pedal characteristic between 0% and the brake pedal input causing the maximum brake pedal deceleration demand is possible.

Preferably, the brake pedal brake demand of the brake pedal characteristic increases continuously from 0% brake pedal input to 100% brake pedal input or to the brake pedal input causing the maximum brake pedal deceleration demand.

Preferably, the brake pedal input causing the brake pedal to generate the maximum brake pedal deceleration demand, is at a brake pedal input of 100%. In particular, in step S3, the brake pedal characteristic between 0% and 100% brake pedal input is adjusted. For example, particular points of the brake pedal characteristic are adjusted. The adjusting is preferably carried out according to a mathematical calculation or according to a look-up table. A linear, progressive or degressive brake pedal characteristic between 0% and 100% brake pedal input is possible. In this case, the sensitivity of the brake pedal can be adjusted. For example, a quadratic or polynomial brake pedal characteristic between 0% and 100% brake pedal input is possible.

Preferably, the achievable deceleration potential is a maximum achievable deceleration potential. By taking the maximum achievable deceleration potential into account, it can be determined to which deceleration the vehicle can purely decelerate by using the deceleration device. Further preferably, the achievable deceleration potential is determined for 0% acceleration pedal input.

Preferably, the further deceleration demand generating device comprises an accelerator pedal, in particular configured for a one-pedal driving mode, a deceleration demand input device, and/or a driver assistance function. Preferably, the driver assistance function comprises a cruise control function. Preferably, the deceleration demand input device comprises a retarder input unit, in particular a retarder lever or a unit configured as an interface, where the driver can input a desired deceleration.

Preferably, the brake pedal characteristic comprises one of the following elements as a brake pedal deceleration demand a deceleration value, a brake torque, an actuator force, an actuator current, an actuator voltage and/or an actuator pressure. The at least further deceleration demand preferably comprises the same elements, accordingly. The brake pedal characteristic is in particular based on the driver's input. That means, the brake pedal characteristic describes, which brake pedal deceleration demand is generated according to a specific brake pedal input. The actuator force, the actuator current, the actuator voltage and/or the actuator pressure describe parameters of an actuator configured to activate the brake unit. The actuator force can describe a force applied to a mechanical brake of the brake unit for generating a brake torque or force. This actuator can be configured as an electro mechanic and/or fluidic, in particular pneumatic or hydraulic, actuator. As an electro mechanic actuator an actuator force can be described by the actuator current and/or the actuator voltage. When the actuator is configured as a fluidic actuator, the actuator force can be described by a fluidic pressure acting in a pressure chamber of the actuator. The actuator force, the actuator current, the actuator voltage and/or the actuator pressure can also be assigned to the deceleration value and/or the brake torque of the brake pedal characteristic.

Preferably at least one of the steps S1, S2, S3, in particular all of the steps S1, S2, S3, is/are executed continuously.

According to one further aspect of the invention, a main deceleration demand is generated based on the brake pedal deceleration demand and the at least one further deceleration demand, wherein the vehicle is configured to decelerate according to the main deceleration demand. This aspect can be combined with the method above or it can be seen as a separate subject-matter. Preferably, the brake unit and/or the deceleration device are/is configured to decelerate the vehicle according to the main deceleration demand.

Preferably, the main deceleration demand is generated by selecting a deceleration demand from the brake pedal deceleration demand and from the at least one further deceleration demand or by adding-up the brake pedal deceleration demand and at least one of the at least one further deceleration demand. Preferably, in the case of selecting a deceleration demand and when the driver starts to generate a brake pedal deceleration demand via the brake pedal, the brake pedal deceleration demand at 0% brake pedal input corresponds to a main brake demand causing the current deceleration of the vehicle. Preferably, in the case of adding-up the deceleration demands and when the driver starts to generate an input via the brake pedal, the brake pedal deceleration demand at 0% brake pedal input can be set to zero brake pedal deceleration demand since the main brake demand at 0% brake pedal input starts at the current deceleration demand generated by the further deceleration demand generating device.

Additionally or alternatively, the method comprises a mode, wherein the brake pedal deceleration demand and the at least one further deceleration demand are added-up, in particular to the main deceleration demand mentioned above. That means, that the deceleration of the vehicle is controlled by the sum of at least the brake pedal deceleration demand and the at least one further deceleration demand. Preferably, this mode is configured as an emergency mode, wherein the focus is not directed to the avoidance of disruption in the generating of the deceleration demand but to generate a maximum deceleration demand for the vehicle as quick as possible. In particular, this mode can be activated when the gradient the brake pedal is pressed, exceeds a predetermined threshold. Preferably, in this mode, the brake pedal characteristic is adjusted to a steep rise. Further preferably, the brake pedal input generating the maximum deceleration demand, wherein the brake pedal deceleration demand and the further deceleration demand are added is moved in this mode to a brake pedal input lower than 100%. Advantageously, if this mode is configured as an emergency mode, the maximum deceleration demand is earlier as the driver presses the brake pedal. In particular, if the driver does not press the brake pedal to 100% brake pedal input in an emergency case, the probability of generating a maximum brake demand by the driver's input is increased.

Preferably, the achievable deceleration potential is determined by learning how much deceleration is being achieved by the deceleration device and/or by a combination of different deceleration devices and/or by a combination of one or more deceleration devices with the brake unit, in particular while driving in OPD mode. According to this aspect of the invention parameters of the control of the brake unit and/or the deceleration device can be adjusted to react to the actual behaviour of the vehicle. In particular, these combinations comprise one or more electric machines, one or more retarders and/or one or more brakes, in particular friction brakes.

In the following, particular aspects of the invention are listed, which are not meant to limit the scope of the invention. Instead, further preferred embodiments are described.

Preferably, the deceleration device comprises a retarder, a brake, in particular an endurance brake and/or a mechanical brake, in particular a friction brake, and/or an electric machine configured to decelerate the vehicle, and/or an eddy current brake.

Preferably, the method is executed during an OPD mode. Alternatively or additionally, the method is executed during a general mode.

Preferably, the achievable deceleration potential describes a parameter of the vehicle that causes the deceleration of the vehicle. In particular, the achievable deceleration potential can be characterized by a brake torque and/or a brake force generated by the deceleration device and/or the brake unit and/or an achievable deceleration value itself. Additionally or alternatively, the achievable deceleration potential can comprise an acceleration or deceleration value as well.

The achievable deceleration potential can be affected by a general malfunction of the deceleration device and/or of the brake unit, wherein in particular, the deceleration device and/or the brake unit cannot generate the required braking force or braking torque or in general the required deceleration of the vehicle.

Further, if the deceleration device comprises an electric drivetrain with an electric storage, the achievable deceleration potential can be affected by a SOC of an electric storage of the vehicle. As described above, when the electric energy storage is full and cannot store any more electric energy, the deceleration caused by the electric drivetrain must be reduced or this operation must be stopped. A limitation of an electric current can also affect the achievable deceleration potential.

Another reason for a malfunction is when a temperature of the deceleration device or of a part of the deceleration device exceeds a predetermined threshold, which causes the deceleration device to reduce its deceleration power and respectively its deceleration effect on the vehicle. Further, to keep the temperature under the predetermined threshold, the deceleration device has to be operated with reduced deceleration power causing a decreasing of the deceleration effect on the vehicle.

Further, the adjusting of the brake pedal characteristic according to step S3 or the determining of an achievable deceleration potential according to step S1 can include that a reaction time of the brake unit and/or the deceleration device is taken into account. That means, if the brake unit or deceleration device is reacting slowly to a new deceleration demand, the deceleration caused is increasing over a period of time. That means, the achievable deceleration potential according to the further deceleration demand increases over this period as well. Such a reaction can occur when retarders, in particular dissipative retarders, are used. Such reaction can be taken into account in step S1 or Step S3 by measuring or by the knowledge of the reaction of the corresponding brake unit or deceleration device.

Furthermore, reference is made to the limiting aspects described above concerning prior art.

Preferably, the achievable deceleration potential is a maximum achievable deceleration potential. By taking the maximum achievable deceleration potential into account, it can be determined to which deceleration the vehicle can purely decelerate by using the deceleration device. Further preferably, the achievable deceleration potential is determined for 0% acceleration pedal input.

Preferably, the brake unit comprises at least one mechanical brake as a friction brake, in particular a disc brake and/or drum brake.

Preferably, the brake pedal characteristic is set or adjusted from the actual deceleration achieved by the deceleration device and/or to the maximum deceleration achieved by the brake unit, in particular during OPD mode. By permanently taking the actual deceleration into account, the adjusting of the brake pedal characteristic can be executed permanently or continuously. This leads to a method wherein a transition between the deceleration device and the brake unit can permanently be adjusted, so that reaction to a fast increasing brake demand or a switch from the accelerator pedal to the brake pedal can be realized accordingly, also even without a jerk. Further, the deceleration, in particular maximum deceleration, achieved by the brake unit can be taken into account as well, to react to (condition) changes of the brake unit.

Preferably, when the deceleration device comprises more than one device to decelerate the vehicle, a choice can be made by a control unit and/or by the driver which device is used for deceleration. For example before driving on a downhill route, deceleration of the vehicle by the deceleration device is caused by a hydraulic retarder while deceleration on the downhill route is caused by an electric drivetrain. Therefore, a full SOC of the electric storage is avoided by entering the downhill route so that deceleration by the electric drivetrain can be executed.

In the following further embodiments are described, using the method as described above. Each of the following embodiments preferably comprises according features as described by the preceding description relating to the method.

According to a further aspect of the invention, a device is provided for performing the method as described above, wherein the device comprises an interface for receiving input data, in particular a deceleration demand and/or an achievable deceleration potential, like a deceleration value;

an interface for providing output data, in particular the target brake pedal characteristic and/or signals for adjusting the brake pedal characteristic; and a data processing unit configured to perform the method as described above.

Preferably, the deceleration demand received by the device is a brake pedal deceleration demand, at last one further deceleration demand and/or a main deceleration demand.

Preferably, the device is configured as a control unit, in particular a brake or drive control unit.

According to another aspect of the invention, a vehicle for performing the method as described above is provided, wherein the vehicle is configured for performing the method as described above and/or wherein the vehicle comprises a device as described above, wherein the vehicle is preferably configured as a commercial vehicle, a truck, a trailer, a bus and/or as a combination of a towing vehicle and a trailer, and/or wherein the vehicle preferably comprises a deceleration device and a brake unit as described above.

According to another aspect of the invention, a computer program product is provided comprising program code configured so that when executed on a data processing unit, in particular a data processing unit as described above, it causes the data processing unit to perform the method as described above.

According to a further aspect of the invention, a storage medium is provided comprising a computer program product as described above. According to this aspect, the program code can be provided to several data processing units to configure them for execution of the method according to the invention. The storage medium can comprise a CD-ROM, a memory stick and/or a cloud storage.

Each subject-matter according to the aspects above can comprise corresponding features that were mentioned describing the method above. For example, the vehicle can comprise a mechanical brake as a friction brake, in particular a disc brake and/or drum brake.

DETAILED DESCRIPTION OF THE DRAWINGS

In the following, a preferred embodiment of the invention is described by the use of FIG. 3.

Figure 3:
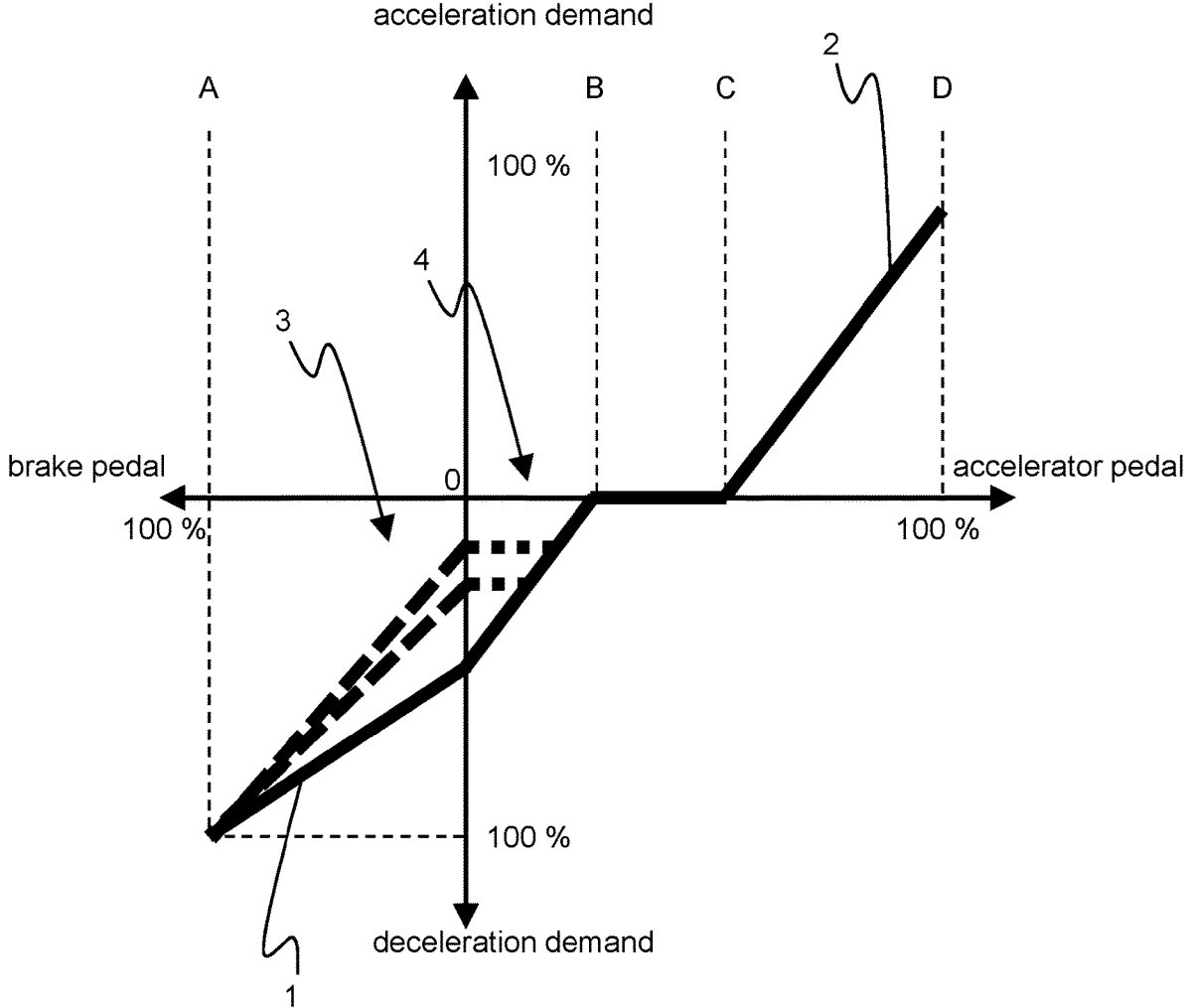
FIG. 3 shows an adjusted brake pedal characteristic according to an embodiment of the invention.

FIG. 3 shows adjusted brake pedal characteristics according to an embodiment of the invention.

Figure 1:
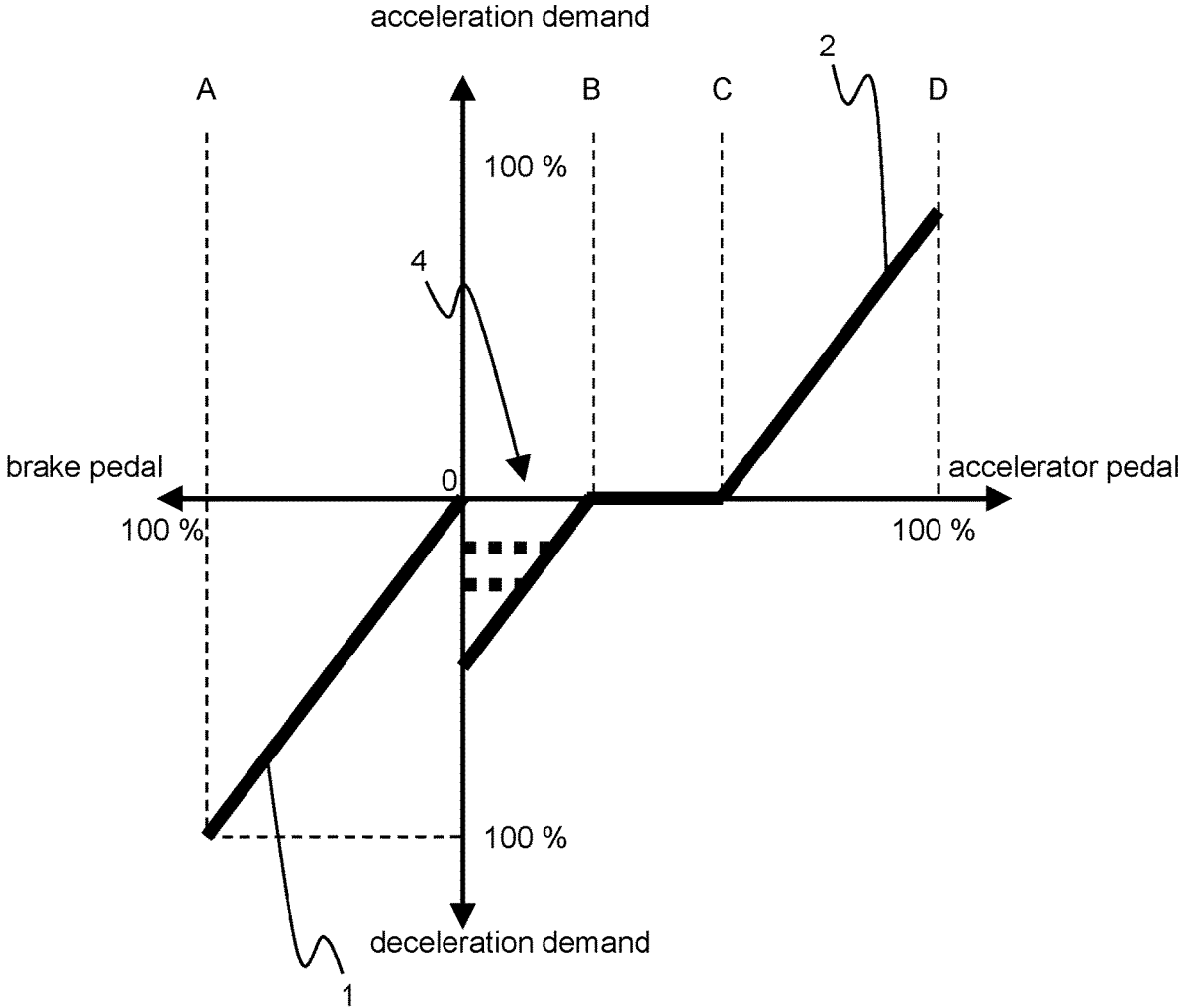
FIG. 1 shows a brake pedal characteristic according to the prior art.
Figure 2:
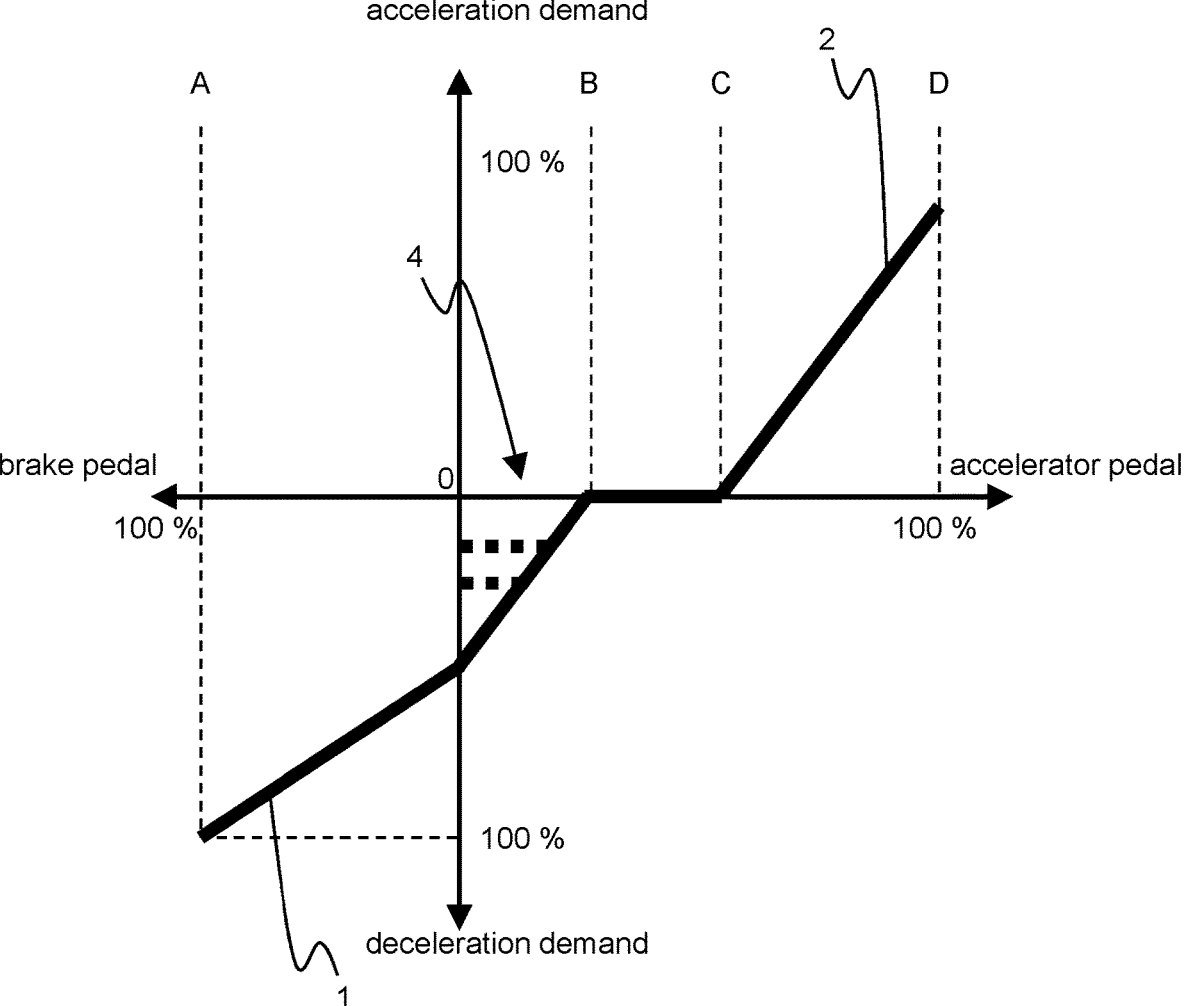
FIG. 2 shows another brake pedal characteristic according to the prior art.

The drawing is based on the FIGS. 1 and 2. Therefore, only the differences thereto are described in the following. Otherwise, reference is made to the description of FIGS. 1 and 2.

The adjusted brake pedal characteristics 3 are illustrated by the dotted lines, wherein two different curves of the adjusted brake pedal characteristics 3 are shown. The adjusted brake pedal characteristic 3 are the result of an adjustment according to the invention under consideration of an achievable deceleration potential 4 (shown by dotted horizontal lines) of the vehicle that is achievable by the deceleration demand generated by the accelerator pedal characteristic 2. The accelerator pedal characteristic 2 corresponds to the characteristics of FIGS. 1 and 2 and corresponds to a OPD mode.

For some reason, in particular for the reasons as described above in the general part of the description, deceleration of the vehicle according to the accelerator pedal characteristic 2 is not possible to its maximum deceleration as shown by the dotted lines. Here, the achievable deceleration potential 4 is lower than expected.

According to the invention, this achievable deceleration potential 4 is determined, in particular according to the method step S1, and the corresponding brake pedal characteristic 3 is adjusted, wherein a brake demand value of the brake pedal characteristic 3 is generated based on the achievable deceleration potential 4 according to step S2 and wherein the brake pedal characteristic 3 is adjusted accordingly in step S3. That means, that if the driver switches from the accelerator pedal to the brake pedal and increases the input by the brake pedal to decelerate the vehicle, the brake demand causing the vehicle to decelerate is generated continuously.

Further, as it can be seen in FIG. 3, the adjusted brake pedal characteristic 3 does not comprise a jerk when the brake pedal is pressed.

Further, the brake pedal characteristic 3 is adjusted in such way that at the maximum input value from the brake pedal (100% input) a maximum brake demand, in particular of 100% is generated.

Figure 4:
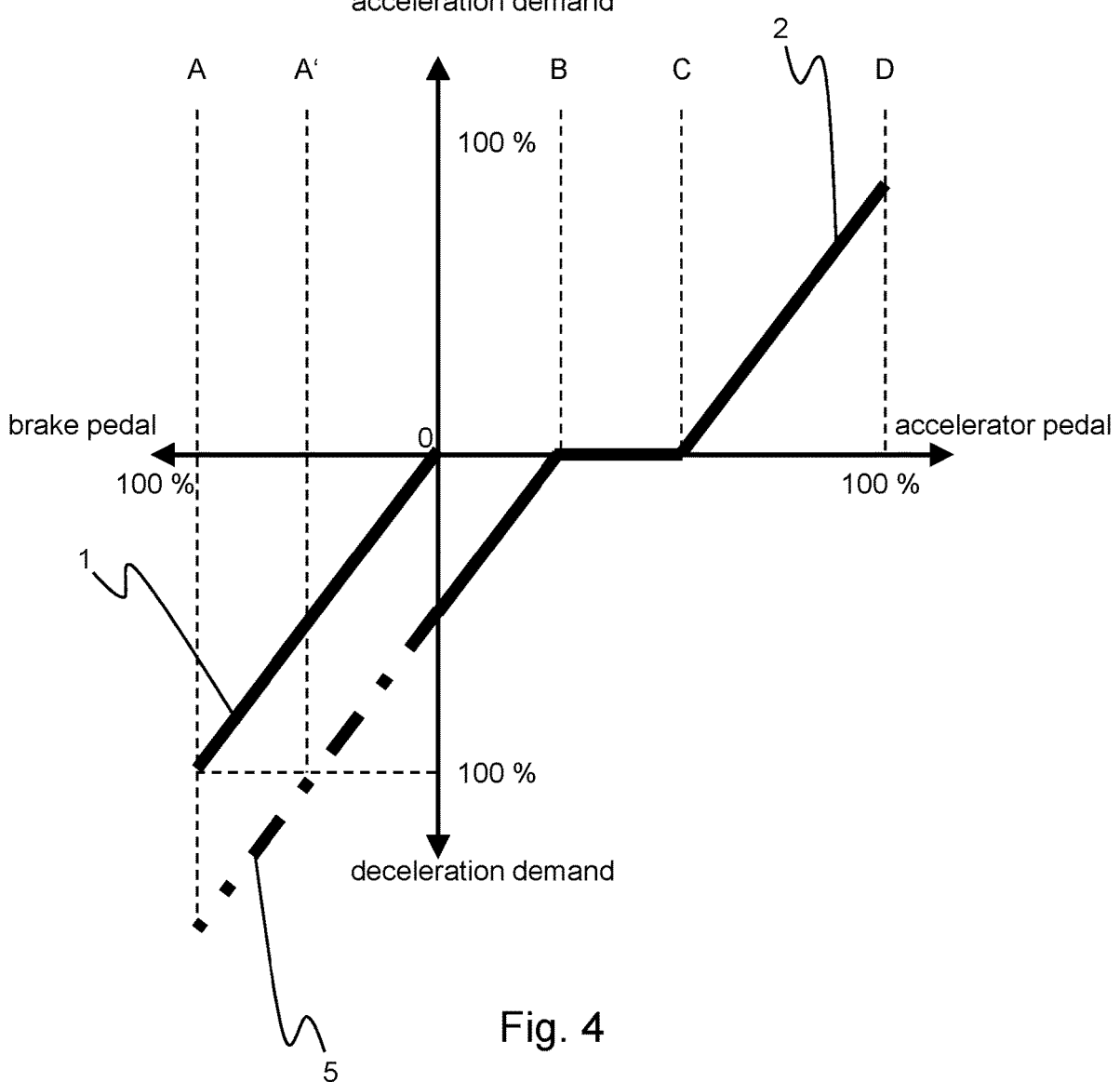
FIG. 4 shows an adjusted brake pedal characteristic according to an additive approach the invention.

FIG. 4 shows an adjusted brake pedal characteristic according to an additive approach.

This drawing is based on the drawing of FIG. 1. However, the principle described here can also be applied to the embodiments shown in FIG. 2 and FIG. 3.

According to this approach, the brake pedal deceleration demand generated according to the brake pedal characteristic 1 and the deceleration demand generated according to the accelerator pedal characteristic 2 are summed-up to the sum of deceleration demands 5. That means, the deceleration demand generated according to the accelerator pedal characteristic 2 at 0% brake pedal input is kept and the brake pedal deceleration demand generated according to the brake pedal characteristic 1 is added to this deceleration demand.

As it can be seen in FIG. 4, the brake pedal characteristic 1 was not adjusted here. As a result, a sum 5 of both demands is generated, wherein at a point A', which corresponds to a brake pedal input lower than 100%, the maximum deceleration demand for the vehicle is reached.

Therefore, the approach of adding-up the deceleration demand is preferably carried out in an emergency case, when the maximum deceleration demand has to be reached quickly, respectively at lower brake pedal inputs.

List of Reference Signs

1 brake pedal characteristic
2 accelerator pedal characteristic
3 adjusted brake pedal characteristic
4 achievable deceleration potential
5 sum of deceleration demands
A point of maximum deceleration demand
A' adjusted point of maximum deceleration demand
B point
C point
D point of maximum acceleration demand
The invention claimed is:

1. A method for adjusting a brake pedal characteristic of a vehicle, wherein the vehicle comprises a brake pedal configured to generate a brake pedal deceleration demand and a further deceleration demand generating device to generate the further deceleration demand, wherein the vehicle is configured to decelerate according to the brake pedal deceleration demand and to the further deceleration demand, wherein the method comprises the steps of:
   (S1): determining an achievable deceleration potential as a result of the further deceleration demand;
   (S2): generating a deceleration demand for adjusting the brake pedal deceleration demand at 0% brake pedal input according to the achievable deceleration potential; and
   (S3): adjusting the brake pedal characteristic of the vehicle.

2. The method according to claim 1, wherein the vehicle comprises a deceleration device and/or a brake unit,
   the deceleration device and/or the brake unit are configured to decelerate the vehicle according to the brake pedal deceleration demand and/or according to the further deceleration demand.

3. The method according to claim 2, wherein the deceleration device comprises a retarder, a brake, an endurance brake and/or an electric machine configured to decelerate the vehicle, and/or
   the brake unit comprises at least one mechanical brake as a friction brake, a disc brake, and/or a drum brake.

4. The method according to claim 1, wherein in step (S3), the maximum brake pedal deceleration demand of the brake pedal characteristic is set at 100% brake pedal input, or
   in step (S3), the maximum brake pedal deceleration demand of the brake pedal characteristic is set at a brake pedal input, which is lower than 100% brake pedal input.

5. The method according to claim 4, wherein in step (S3), a brake pedal deceleration demand of the brake pedal characteristic is set at a brake pedal input between 0% brake pedal input and the brake pedal input causing the maximum brake pedal deceleration demand.

6. The method according to claim 1, wherein the achievable deceleration potential is a maximum achievable deceleration potential.

7. The method according to claim 1, wherein the further deceleration demand generating device comprises an accelerator pedal configured for a one-pedal driving mode, a deceleration demand input device, and/or a driver assistance function.

8. The method according to claim 1, wherein the brake pedal characteristic comprises as a brake pedal deceleration demand a deceleration value, a brake torque, an actuator force, an actuator current, an actuator voltage, and/or an actuator pressure.

9. The method according to claim 1, wherein at least one of steps S1, S2, S3 is/are executed continuously.

10. The method according to claim 1, wherein all of the steps is/are executed continuously.

11. The method according to claim 1, wherein a main deceleration demand is generated based on the brake pedal deceleration demand and the further deceleration demand, and
   the vehicle is configured to decelerate according to the main deceleration demand.

12. The method according to claim 11, wherein the main deceleration demand is generated by selecting a deceleration demand from the brake pedal deceleration demand and from the further deceleration demand or by adding-up the brake pedal deceleration demand and at least one of the further deceleration demand.

13. The method according to claim 1, wherein the achievable deceleration potential is determined by learning how much deceleration is being achieved by the deceleration device and/or by a combination of different deceleration devices and/or by a combination of one or more deceleration devices with the brake unit.

14. The method according to claim 13, wherein the achievable deceleration potential is determined while driving in one-pedal drive mode.

15. A device for adjusting a brake pedal characteristic of a vehicle, comprising:

an interface for receiving input data comprising a deceleration demand and/or an achievable deceleration potential;

an interface for providing output data comprising a target brake pedal characteristic and/or signals for adjusting the brake pedal characteristic; and a data processing unit configured to:

determine the achievable deceleration potential as a result of a further deceleration demand;

generate a deceleration demand for adjusting the brake pedal deceleration demand at 0% brake pedal input according to the achievable deceleration potential; and adjust the brake pedal characteristic of the vehicle.

16. A vehicle having a brake pedal characteristic adjusted, comprising:

a device according to claim 15;

wherein the vehicle is configured as a commercial vehicle, a truck, a trailer, a bus and/or as a combination of a towing vehicle and a trailer, and/or wherein the vehicle comprises a deceleration device and a brake unit.

17. A computer product comprising a non-transitory computer readable medium having stored thereon program code which, when executed on a data processing unit, carries out the acts of:

(S1): determining an achievable deceleration potential as a result of a further deceleration demand;

(S2): generating a deceleration demand for adjusting the brake pedal deceleration demand at 0% brake pedal input according to the achievable deceleration potential; and (S3): adjusting the brake pedal characteristic of the vehicle.

* * * * *